United States Patent
Rose et al.

(10) Patent No.: US 10,392,744 B2
(45) Date of Patent: Aug. 27, 2019

(54) ELASTIC FLOOR COVERING IN THE FORM OF A WEB PRODUCT THAT CAN BE ROLLED UP

(71) Applicant: WPT GMBH, Detmold (DE)

(72) Inventors: Stefan Rose, Warstein (DE); Guido Horst, Bünde (DE); Ulrich Windmöller, Schloss Holte-Stukenbrock (DE)

(73) Assignee: WPT GMBH, Detmold (DE)

( * ) Notice: Subject to any disclaimer, the term of this patent is extended or adjusted under 35 U.S.C. 154(b) by 180 days.

(21) Appl. No.: 15/027,886

(22) PCT Filed: Oct. 11, 2013

(86) PCT No.: PCT/EP2013/071274
§ 371 (c)(1),
(2) Date: Apr. 7, 2016

(87) PCT Pub. No.: WO2015/051851
PCT Pub. Date: Apr. 16, 2015

(65) Prior Publication Data
US 2016/0251800 A1   Sep. 1, 2016

(51) Int. Cl.
| | |
|---|---|
| *D06N 3/18* | (2006.01) |
| *D06N 3/14* | (2006.01) |
| *B32B 5/02* | (2006.01) |
| *B32B 7/12* | (2006.01) |
| *B32B 27/08* | (2006.01) |
| *B32B 27/40* | (2006.01) |

(52) U.S. Cl.
CPC ............ *D06N 3/183* (2013.01); *B32B 5/022* (2013.01); *B32B 5/024* (2013.01); *B32B 7/12* (2013.01); *B32B 27/08* (2013.01); *B32B 27/40* (2013.01); *D06N 3/0006* (2013.01); *D06N 3/0011* (2013.01); *D06N 3/0088* (2013.01); *D06N 3/045* (2013.01); *D06N 3/14* (2013.01); *E04F 15/16* (2013.01); *B32B 2255/02* (2013.01); *B32B 2255/26* (2013.01); *B32B 2262/101* (2013.01); *B32B 2307/51* (2013.01);
(Continued)

(58) Field of Classification Search
CPC .... D06N 3/183; D06N 3/0006; D06N 3/0011; D06N 3/0088; D06N 3/045; D06N 3/14; B32B 5/022; B32B 5/024; B32B 7/12
See application file for complete search history.

(56) References Cited

U.S. PATENT DOCUMENTS

| | | | |
|---|---|---|---|
| 5,750,580 A * | 5/1998 | Mayer ............... | B29C 67/246 521/160 |
| 2010/0227132 A1* | 9/2010 | Pierson ............... | B32B 7/12 428/201 |

(Continued)

FOREIGN PATENT DOCUMENTS

| | | |
|---|---|---|
| DE | 10229473 A1 | 6/2003 |
| DE | 102005025980 A1 | 12/2006 |

(Continued)

*Primary Examiner* — Jeremy R Pierce
(74) *Attorney, Agent, or Firm* — Richard M. Goldberg

(57) ABSTRACT

An elastic floor covering (10) in the form of sheets, which can be rolled up, includes a soft core (18) of polyurethane and a layered compound structure (24) disposed on the core (18), and the back of the floor covering (10) is formed by a fiber mat, the fibers of which consist of glass, PET, PP, polyester or renewable raw materials, and which is sealed by a barrier layer on its side facing the core.

20 Claims, 3 Drawing Sheets

(51) Int. Cl.
*E04F 15/16* (2006.01)
*D06N 3/00* (2006.01)
*D06N 3/04* (2006.01)

(52) U.S. Cl.
CPC ....... *B32B 2419/04* (2013.01); *B32B 2471/04* (2013.01); *D06N 2203/042* (2013.01); *D06N 2203/068* (2013.01); *D06N 2209/12* (2013.01); *D06N 2209/1635* (2013.01); *D10B 2101/06* (2013.01)

(56) References Cited

U.S. PATENT DOCUMENTS

| | | | |
|---|---|---|---|
| 2011/0268933 A1 | 11/2011 | Hahn et al. | |
| 2012/0258269 A1* | 10/2012 | Gehringer | C08G 18/00 428/36.9 |
| 2012/0276348 A1* | 11/2012 | Clausi | E04F 13/002 428/196 |

FOREIGN PATENT DOCUMENTS

| | | |
|---|---|---|
| DE | 102007041484 A1 | 3/2009 |
| DE | 102007046226 A1 | 4/2009 |
| DE | 102008023017 A1 | 11/2009 |
| JP | 2001-524610 A | 12/2001 |
| JP | 2003-105960 A | 4/2003 |
| JP | 2003-529474 A | 10/2003 |
| JP | 2011-236733 A | 11/2011 |
| JP | 2014-527131 A | 10/2014 |
| WO | 99/19557 A1 | 4/1999 |
| WO | WO-2011083000 A1 * | 7/2011 ............. C08G 18/00 |
| WO | 2011/100734 A1 | 8/2011 |
| WO | 2013/064160 A1 | 5/2013 |

* cited by examiner

ELASTIC FLOOR COVERING IN THE FORM OF A WEB PRODUCT THAT CAN BE ROLLED UP

BACKGROUND OF THE INVENTION

The present invention relates to an elastic floor covering in the form of sheets, which can be rolled up and have a soft core of polyurethane and a layered compound structure disposed on the core.

Such floor coverings have been produced for a long time already from plastic materials, such as PVC or linoleum. Furthermore, polyurethane is suitable as a material for such floor coverings. For example, a floor covering is known from the international patent application WO2013/064160 of the applicant, for which at least the core consists of polyurethane, which is obtained from a polyester polyol of renewable raw materials and aromatic isocyanate. Among other things, this involves advantages with respect to environmental compatibility. This floor covering, furthermore comprises a decorative layer, which is disposed on the core, and a wear-resistant use surface. Within the scope of the present application, the layers on the core generally are to be referred to as a layered compound structure, it being noted that this layered compound structure may also be arranged differently, and, for example, may have additional or different layers. The concept of the layered compound structure, used here, accordingly, is not limited to the sequence of layers, which is described in WO2013/064160.

Because of its flexibility, such a floor covering can easily be delivered in roll containers and laid by gluing it to the screed. The flexibility also leads to positive use properties, such as a good footstep sound insulation. Depending on the use of the floor covering, the dimensional stability, the impression behavior under load and the athletic functionality with regard to force reduction may also often be of decisive importance for its quality.

In order to be able to glue the floor covering reliably over its whole surface to the substrate, the back of the covering must be able to form a good bond with the adhesive. Therefore, until now, it was customary to grind the back of the floor covering or to provide it with a surface structure, such as a honeycomb structure or the like, into which the adhesive can penetrate well. In spite of these additional measures, the bond between the dispersion adhesive and the back of the floor covering frequently is unsatisfactory. It is, moreover, desirable to improve the above-mentioned positive properties of the floor covering even further, also by an appropriate design of its back.

SUMMARY OF THE INVENTION

It is therefore an object of the present invention to improve even further the adhesion of the floor covering to the substrate and, in particular, the cohesion with an adhesive applied thereon and especially the footstep sound insulation and the elasticity.

This objective is accomplished pursuant to the invention by a floor covering with the features of the claims.

On its back, the elastic floor covering sheet of the present invention, which can be rolled up, has a fiber mat, the fibers of which consist of glass, PET, PP, polyester or renewable raw materials. On the side facing the core, the fibrous structure of the mat is sealed by a barrier layer.

A liquid adhesive, which is applied on the screed, can penetrate between the fibers of the mat, so that the adhesive and the fiber mat and, accordingly, the whole of the floor covering are connected uniformly with one another. This connection is far more reliable than the connection in the case of floor coverings, which are merely ground at their underside or embossed on their back. It is no longer possible to raise the floor covering nondestructively. The barrier layer ensures that, during the process of manufacturing the floor covering, the fiber mat can be laminated or glued to the back of the floor covering, without filling the interstices between the fibers with an adhesive or gluing the material of the core, depending on the manufacturing process. Accordingly, a liquid material can be applied on the fiber mat during the manufacturing process, without affecting the desired use properties of the mat.

Because the fibers of the mat cohere comparatively loosely, the fiber mat can have a certain elasticity, which has a positive effect on the properties of the floor covering as a whole. For example, the footstep sound insulation can be improved, as can the force transmission into floor coverings, which are used as athletic floors. Finally, the fiber mat can also form a counter-pull layer to the layered compound structure on the upper side of the floor covering.

On the whole, the present floor covering represents a complex layered structure, which, in comparison to floor coverings, which are described above as prior art, has improved properties, and, at the same time, can be laid more reliably and more permanently.

In accordance with a preferred embodiment of the present invention, the fibers of the fiber mat form a nonwoven.

In accordance with a further preferred embodiment, the fibers are interwoven with one another to form a fabric mat.

In both cases, interstices, into which the liquid adhesive can penetrate and enter into the desired bonding with the floor covering, can remain between the fibers.

In accordance with a further preferred embodiment, the fiber mat is glued to the back of the core. The adhesive, used for this purpose, does not penetrate into the nonwoven, since this is prevented reliably by the barrier layer. The interstices between the fibers, accordingly, are retained for taking up the adhesive for gluing the floor covering to the screed.

In accordance with a further improved embodiment, the barrier layer is formed from polyolefin, polyethylene terephthalate (PET), polyamide (PA) or thermoplastic polyurethane (TPU).

Furthermore, preferably, the core consists of polyurethane, which is obtained from a polyester polyol of renewable raw materials and aromatic isocyanate. It is a question here of a biogenic polyol, which has good properties with respect to environmental compatibility and can be produced sustainably. Moreover, the core may contain fillers for increasing the weight.

In accordance with a further preferred embodiment of the present invention, the layered compound structure of the floor covering, which is disposed on the core, comprises at least one decorative layer, which consists of fiber paper that is impregnated with polyurethane, a wear-resistant use surface on the side of the decorative layer averted from the core, which consists of a polyurethane, which is obtained from a polyol and an aliphatic isocyanate and a fiberglass mat. This can improve the impression behavior and the recovery behavior as well the dimensional stability even further.

An inventive method for producing a floor covering of the above-described type comprises the following steps:
a) putting down a fiber mat sheet, which is formed from fibers of glass, PET, PP, polyester or renewable raw materials and sealed on one side by a barrier layer, on a carrier strip in such a manner, that the barrier layer is at the top;

b) applying a layer of polyurethane on the fiber mat for forming the core;

c) applying an adhesive on the upper side of the core and d) gluing a sheet-shaped layered compound structure on the upper side of the core, which is provided with adhesive.

In the above-mentioned step a), the fiber mat sheet can be deposited, for example, on a conveyor belt, which runs over a hotplate. The layer of polyurethane, which is applied on the fiber mat in step b) for the formation of the core, can complete its reaction by the action of the heat of the hot plate. Because of the barrier layer of the fiber mat, the polyurethane, which is applied in the liquid state, cannot penetrate between the fibers of the fiber mat below, so that the interstices between the fibers are retained. The layered compound structure, which is glued in the final step d), may already be prefabricated.

With the above-named method, the inventive, elastic floor covering is thus built up to some extent from the bottom to the top, that is, initially the fiber mat sheet is laid down on its back and the layers, which are disposed thereupon, are applied in accordance with their sequence up to the upper side.

In accordance with an alternative embodiment of the present invention, the method for producing this floor covering comprises the following steps:

a') laying down a sheet-shaped layered compound structure on a carrier strip;

b') applying a sheet of polyurethane on the sheet-shaped layered compound structure to form the core;

c') applying an adhesive on the upper side of the core and d') gluing a fiber mat sheet, which is formed from fibers of glass, PET, PP, polyester or renewable materials and sealed on one side by a barrier layer, on the upper side of the core, which is provided with adhesive, in such a manner, that the barrier layer is at the bottom.

For this alternative method, the layers are produced in the reverse sequence in that initially the layered compound structure, which forms the upper side of the floor covering in the laid down state, is deposited on the carrier strip in step a') and the further layers of the sequence are applied later, up to the fiber mat sheet, which is the last to be glued on and forms the back of the floor covering in step d'). Finally, the floor covering rests on the carrier strip with the wear-resistant surface downward. The barrier layer of the fiber mat sheet here prevents penetration of the adhesive, applied on the upper side of the core in step c'), between the fibers, so that these fibers cannot be glued together.

Preferably, heat is supplied to the polyurethane layer to form the core during or after the above-mentioned steps c) or c'). This can be accomplished, for example, by the already mentioned hot plates underneath the conveyor belt. Alternatively, however, it is also possible to let infrared radiation act from above on the polyurethane layer.

In this case, the fiber mat sheet preferably is a nonwoven sheet.

Furthermore preferably, the fiber mat sheet is a woven fabric sheet.

In accordance with a furthermore preferred embodiment of this method, the barrier layer is formed from polyolefin, polyethylene terephthalate (PET), polyamide (PA) or thermoplastic polyurethane (TPU).

In accordance with a preferred embodiment of the inventive method, the core is formed in step b) or b') from a polyurethane, which is obtained from a polyester polyol of renewable raw materials and an aromatic isocyanate.

Furthermore preferably, the sheet-shaped layered compound structure is deposited or applied in the prefabricated state in steps d) or a') and comprises at least one decorative layer, which consists of a fiber paper, which is impregnated with polyurethane, a wear-resistant surface, which rests on the side of the decorative layer averted from the core and consists of a polyurethane, which is obtained from a polyol and an aliphatic isocyanate, and a fiberglass mat on the side of the decorative layer facing the core.

Preferably, the adhesive in step c) or c') is atomized and applied in droplet form.

BRIEF DESCRIPTION OF THE DRAWINGS

In the following, preferred examples of the present invention are explained in greater detail by means of the drawing.

DETAILED DESCRIPTION

Figure 1:
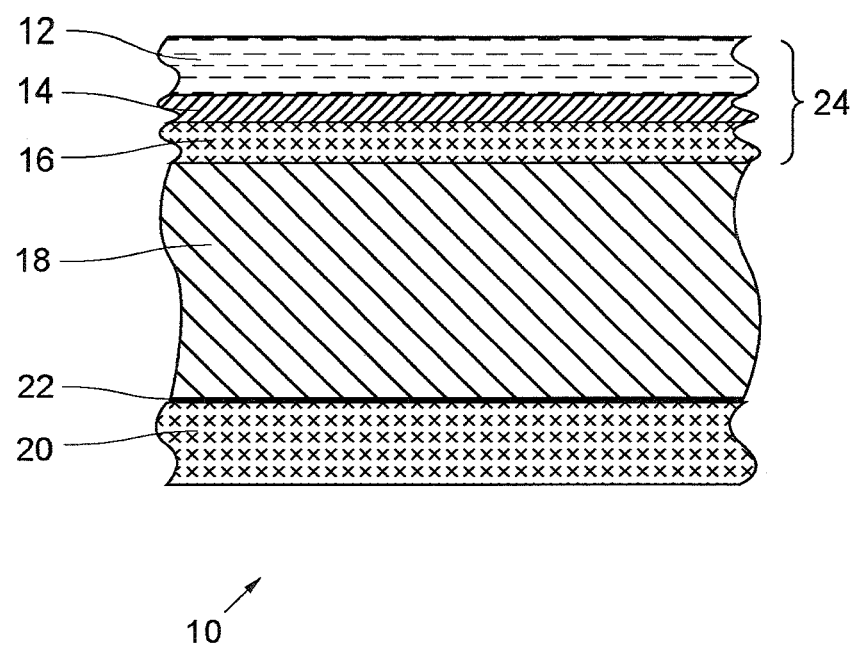
FIG. 1 shows a diagrammatic section through the layer structure of an embodiment of the inventive, elastic floor covering.

In FIG. 1, a cross-section through a sheet-shaped floor covering 10 is shown, which has a layer structure. This comprises (from the top to the bottom, that is, from its usable side to its back) a transparent wear-resistant surface 12, which forms the upper side of the floor covering 10, a decorative layer 14, which lies thereunder and carries a decoration, a fiberglass mat 16 under the decorative layer 14, a soft core 18 and a fiber mat 20, which closes off the layer structure of the floor covering 10 to the substrate. Details of this layer structure are to be described in greater detail in the following.

The wear-resistant use surface 12 consists completely of a polyurethane (PU), which is synthesized from a polyol and an aliphatic isocyanate. In the present case, this polyol is not a biogenic polyol and, accordingly, does not originate from renewable raw materials. Moreover, the wear-resistant use surface 12 has a high scratch resistance, ease of cleaning, UV stability, a good impression and recovery behavior and low emissions of toxic gases in the event of a fire. The impression behavior of the material is understood to be the behavior of the material when subjected to a mechanical load. The surface of the floor covering 10 is very resistant to such effects. In the event that impressions are formed, for example, by an intermittent stress, these impressions disappear almost completely once again when the mechanical load is removed.

For the present embodiment, the wear-resistant use surface 12 has a thickness of between 0.1 and 0.5 mm.

The decorative film 14 below the wear-resistant use surface 12 consists of a decorative paper, namely a layer of cellulose, which is impregnated with polyurethane. This polyurethane may be synthesized from a biogenic polyol, which is thus obtained from a renewable raw material. A decoration has been printed on the upper side of the decorative paper.

To increase the dimensional stability and to improve the impression and recovery behavior of the floor covering 10 further, the layer structure furthermore comprises a fiberglass mat 16, which is disposed between the decorative layer 14 and the core 18 thereunder. The fiberglass mat is also impregnated with polyurethane, which is synthesized from a biogenic polyol. Its thickness is between 0.2 mm and 0.5 mm.

In the present case, the core 18 consists of polyurethane, which is obtained from a polyester polyol of renewable raw materials and an aromatic isocyanate. Admittedly, an aromatic polyol is of a lower value than an aliphatic polyol; however, since the core 18 is not exposed at the upper side of the floor covering 10, the use of materials, which have a lower value, can also be accepted here. Nevertheless, the core 18 has very good properties with regard to environmental compatibility and produces very few emissions. Moreover, the core 18 may contain fillers in order to increase the weight.

The floor covering 10, shown here, is moreover intended to be glued in sheets on a screed. For this purpose, the back of the floor covering 10 has a fiber mat 20, which may, for example, be a nonwoven. It is, however, also conceivable to use a fabric mat as a fiber mat 20. A liquid dispersion adhesive, which is previously distributed on the screed, can penetrate between the fibers. A solid bond is created in this way between the substrate and the elastic floor covering 10. The floor covering 10 can then no longer be removed nondestructively from the substrate.

The fibers of the fiber mat 20 may, for example, be glass fibers or consist of PET (polyethylene terephthalate), PP (polypropylene), polyester or also renewable raw materials, that is, natural fibers. On the side, which faces the core 18 and which is at the top in FIG. 1, the fiber mat 20 is sealed by a barrier layer 22 of polyolefin. However, the barrier layer 22 may also consist of other materials, such as polyethylene terephthalate (PET), polyamides (PA) or thermoplastic polyurethane (TPU). Among other things, the function of the barrier layer 22 is to prevent liquids penetrating from the upper side of the floor covering 10 into the fiber mat 20 and filling the interstices between the fibers. This is of importance for manufacturing the elastic floor covering 10. In particular, the fiber mat 20 may, for example, be glued with the help of a liquid adhesive onto the back of the core 18. Accordingly, the barrier layer 22 prevents this adhesive between the core 18 and the fiber mat 20 penetrating between the fibers.

Aside from the function of taking up adhesive for gluing the floor covering 10, the fiber mat 20 may have other functions in addition, which affect the quality of the floor covering 10. For example, the fiber mat 20 may form a counter-pull on the underside of the floor covering 10 and contribute to the dimensional stability of the latter. Furthermore, because of the relatively loose bonding between the fibers, the fiber mat 20 may also have certain elasticity with respect to pressure loads, and this elasticity may also be preserved, if the adhesive does not penetrate completely from the substrate into the fiber mat 20 and an adhesive-free intermediate layer remains within the fiber mat 20, the hollow spaces of which improve the elastic properties. By these means, the footstep sound behavior and the introduction of forces into the substrate may also be improved.

The ability to roll up the floor covering 10 is not affected by affixing the fiber mat 20. The present elastic floor covering 10 is in the form of a sheet, which can be rolled up, that is, in the form of a carpet, which may be delivered as roll containers and laid simply sheet-wise.

The wear-resistant use layer 12, the decorative layer 14 and the fiberglass mat 16 form a common layered compound structure 24, which may be prefabricated in a manufacturing process for producing the above-describe floor covering 10, while the remaining layers, that is, in particular, the core 18 and the fiber mat 20, are bonded only subsequently with this layered compound structure 24. This is to be described in detail in the following.

Figure 2:
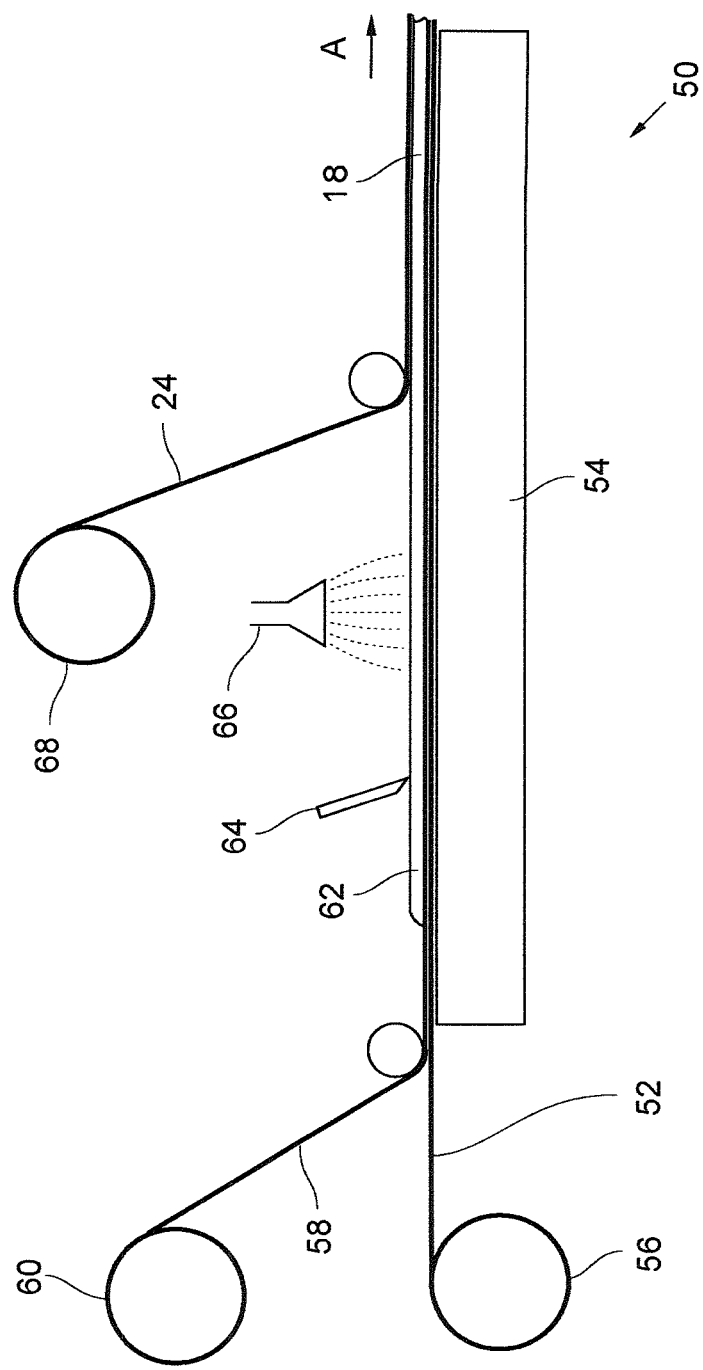
FIGS. 2 and 3 are diagrammatic representations of two different method sequences for producing the inventive floor covering.

FIG. 2 is a diagrammatic representation of a first embodiment of a method for producing the sheet-shaped floor covering 10 of the type described above, which can be rolled up. This Figure shows a portion of a production plant, with the help of which this method can be carried out. This plant 50 comprises a carrier strip 52, which, in FIG. 2, is passed from left to right in the direction of the arrow A over a hot plate 54. The carrier strip 52 lies flat on the upper side of the hot plate 54. It may be an endless strip, the tight side of which is passed over the hot plate 54 or the carrier strip 52 is unrolled from a roll 56 and rolled up once again at the end of the production line (not shown). The floor covering 10 is formed on this carrier strip 52 in that, initially, a fiber mat sheet 58 is unrolled from a roll 60 and deposited flat on the section of the carrier strip 52, which rests on the hot plate 54. In its design, the fiber mat sheet 58 corresponds to the fiber mat 20, which is described in conjunction with FIG. 1, that is, the fiber mat sheet 58 is formed from fibers of glass, PET, PP, polyester or renewable raw materials, and is sealed off at one side by a barrier layer 22 of polyolefin, polyethylene terephthalate (PET), polyamide (PA) or thermoplastic polyurethane (TPU). In FIG. 2, this barrier layer 22 is at the top that is, on the upper side of the fiber mat sheet 58, which is averted from the carriers strip 52, and which, moreover, may alternatively be formed from a nonwoven or also constructed as a fabric mat.

In a subsequent step of the method, a layer 62 of polyurethane, which is to form the core 18, is applied on the deposited fiber mat sheet 58. The polyurethane of this layer 62 is cast or sprayed in liquid form on the fiber mat sheet 58. The thickness of the layer 62, which can be checked by suitable measuring devices (not shown), is determined by a doctor blade 64.

The heat is supplied by the hot plate 54 beneath the carrier strip 52 and acts through the carrier strip 52 and a fiber mat sheet 58 into the layer 62. The core 18 is produced completely after the layer 62 has finished reacting. Subsequently, in a further step of the method, an adhesive may be applied on the upper surface of the core 18. The adhesive need not be applied continuously over the area, but can also be sprayed on in the form of fine droplets. For this purpose, a turntable 66 may, for example, be used, which is disposed above the core 18 and sprays liquid adhesive radially, so that an approximately uniform distribution of the adhesive droplets on the core 18 is attained.

Finally, in a further step of the method, a sheet-shaped layered compound structure 24 is applied on the core 18, to which it is glued. In the manner described above, this layered compound structure 24 may, for example, comprise the wear-resistant use surface 12, the decorative layer 14 and the fiberglass mat 16 of FIG. 1. The layered compound structure 24 is delivered in a prefabricated form, unwound from a roll 68 and deposited on the upper side of the core 18, on which the adhesive is provided.

A sheet of the elastic floor covering 10, which can be rolled up, is created by the steps of the method described above.

Alternatively to the method described above by means of FIG. 2, it is possible to build up the floor covering 10 in the reverse sequence. This is to be described in the following by means of FIG. 3.

Figure 3:
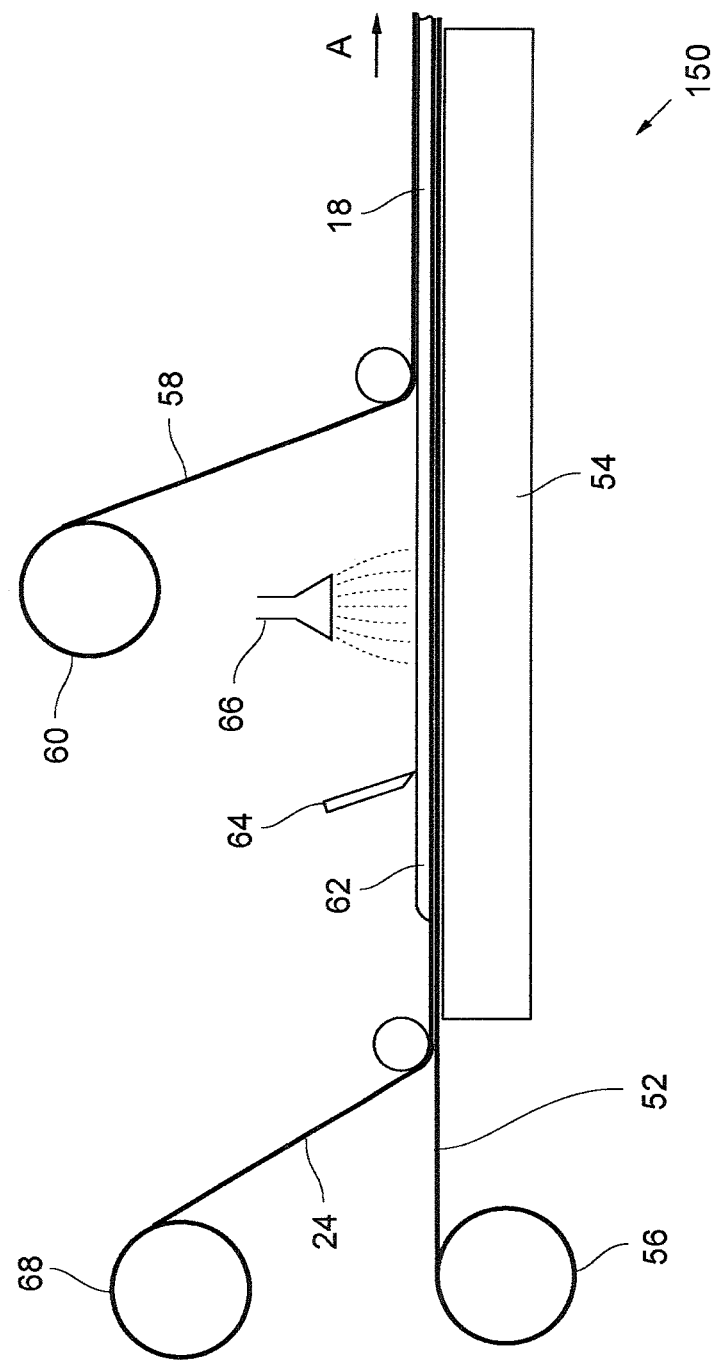

The production plant 150 in FIG. 3 also comprises a carrier strip 52, which is unwound from a roll 56 and passed flat over a horizontal plate 54. In this regard, plant 150 in FIG. 3 is identical with the plant 50 of FIG. 2. The sheet-shaped layered compound structure 24, which is dispensed from a roll 68, so that it rests flat on the upper side of the carrier strip 54, and, together with this, is passed over the hot plate 54 in the direction of arrow A, is deposited on the upper side of this carrier strip 52. Once again, the sheet-shaped layered compound structure 24 comprises here also, the wear-resistant use surface 12, the decorative layer 14 and the fiberglass mat 16, and is deposited on the carrier strip 52, so that the wear-resistant use surface 12 is at the bottom and the fiberglass mat 16 is at the top.

Subsequently, a layer 62 of liquid polyurethane for forming the core 18 is applied on the deposited sheet-shaped layered compound structure 24. This layer 62 is limited to the desired thickness by means of a doctor blade 64. The layer 62 can be cured by the action of heat from the hot plate 54, which acts through the carrier strip 52 and the layered compound structure 24. It is noted that a different source of heat, such as a source of infrared radiation, which is above the layer 62, can also be used instead of the hot plate 54.

The polyurethane of layer 62 reacts completely under the action of heat and forms the core 18, on which an adhesive is applied. In the present case, the adhesive is atomized by means of a turntable 66 and distributed radially over the upper side of the layer 62.

Subsequently, the fiber mat sheet 58 is placed on the upper side of the core 18, to which it is glued. The fiber mat sheet 58 is unwound from a roll 60 and deposited on the core 18 in such a manner, that the barrier layer 22 is at the bottom, that is, facing the core 18. The barrier layer 22 prevents penetration of adhesive, which creates the bond between the core 18 and the fiber mat sheet 58, between the fibers of the fiber mat sheet 58. The fiber mat sheet 58 may, for example, be a nonwoven or a woven fabric sheet.

For this embodiment of the method for producing the floor covering 10, the wear-resistant surface is at the bottom and the back of the floor covering 10 faces upward.

In the present case, the polyurethane for forming the layer 62 of the core 18 may also be obtained from a polyester polyol of renewable raw materials and an aromatic isocyanate. Here also, the core 18 may contain fillers for increasing the weight. Once again, the decorative layer 14 of the layered compound structure 24 may also consist of fiber paper, which is impregnated with polyurethane, and the wear-resistant surface 12 may consist of polyurethane, which is obtained from a polyol and an aliphatic isocyanate.

The product of the method, which is described in conjunction with FIG. 3, is also a sheet with the desired elasticity and can be rolled up. It may be rolled up into roll containers and, accordingly, is easy to transport and lay.

The invention claimed is:

1. An elastic floor covering in the form of sheets, which can be rolled up, comprising:
    a soft core of polyurethane,
    a layered compound structure disposed on the core, and
    a fiber mat formed on a back of the floor covering, including fibers and interstices between the fibers, the fibers of the fiber mat being formed by a material selected from the group consisting of glass, PET, PP, polyester and renewable raw materials, and
    a barrier layer which seals the fiber mat on a side thereof facing the core and prevents liquids penetrating from the core into the fiber mat during the manufacturing process of the floor panel in which a layer of liquid polyurethane is applied on the fiber mat, wherein the barrier layer prevents the interstices between the fibers of the fiber mat to be filled by the liquid polyurethane of the core, the fiber mat being an outermost layer, and the interstices being retained for taking up an adhesive for gluing the floor covering to a screed.

2. The floor covering of claim 1, wherein the fibers form a nonwoven product.

3. The floor covering of claim 1, wherein the fibers are interwoven with one another to form a fabric mat.

4. The floor covering of claim 1, wherein the fiber mat is glued onto the back of the core.

5. The floor covering of claim 1, wherein the barrier layer is formed from a material selected from the group consisting of polyolefin, polyethylene terephthalate (PET), polyamide (PA) and thermoplastic polyurethane (TPU).

6. The floor covering of claim 1, wherein the core comprises polyurethane, which is obtained from a polyester polyol from renewable raw materials and an aromatic isocyanate.

7. The floor covering of claim 1, wherein the layered compound structure comprises:
    at least one decorative layer which includes a fiber paper, which is impregnated with polyurethane,
    a wear-resistant surface, which is on a side of the decorative layer averted from the core and includes a polyurethane, which is obtained from a polyol and an aliphatic isocyanate, and
    a fiberglass mat.

8. A method for the preparation of a floor according to claim 1, comprising the steps of:
    a) depositing a fiber mat sheet, which is formed from a material selected from the group consisting of fibers of glass, PET, PP, polyester and renewable raw materials, has interstices between the fibers, and is sealed on one side by a barrier layer, on a carrier strip in such a manner, that the barrier layer is at a top thereof;
    b) applying a layer of polyurethane on the fiber mat sheet for forming the core, wherein the barrier layer prevents the interstices between the fibers from being filled or glued by the polyurethane;
    c) applying an adhesive on an upper side of the core; and
    d) gluing a sheet-shaped layered compound structure on the upper side of the core, which is provided with adhesive.

9. A method for the preparation of a floor according to claim 1, comprising the steps of:
    a') depositing a seat-shaped layered compound structure on a carrier strip;
    b') applying a layer of polyurethane on the sheet-shaped layered compound structure for forming the core;
    c') applying an adhesive on an upper side of the core; and
    d') gluing a fiber mat sheet, which is formed from a material selected from the group consisting of fibers of glass, PET, PP, polyester and renewable raw materials, has interstices between the fibers, and is sealed on one side by a barrier layer, on an upper side of the core, which is provided with adhesive, in such a manner that the barrier layer is at a bottom thereof, wherein the barrier layer prevents the interstices between the fibers from being filled or glued by the adhesive or the polyurethane composition.

10. The method of claim 8, further comprising the step of supplying heat at least one of during and after step c) to the polyurethane layer for forming the core.

11. The method of claim 8, wherein the fiber mat sheet is a nonwoven mat.

12. The method of claim 8, wherein the fiber mat sheet is a fabric sheet.

13. The method of claim 8, wherein the barrier layer is formed from a material selected from the group consisting of polyolefin, polyethylene terephthalate (PET), polyamides (PA) and thermoplastic polyurethane (TPU).

14. The method of claim 8, wherein the core in step b) is formed from a polyurethane, which is obtained from a polyester polyol of renewable raw materials and an aromatic isocyanate.

15. The method of claim 8, wherein the sheet-shaped layered compound structure is one of deposited and applied in step d) in a prefabricated state and comprises at least one decorative layer, which includes a fiber paper, which is impregnated with polyurethane, a wear-resistant use surface, which lies on a side of the decorative layer averted from the core and includes a polyurethane, which is obtained from a polyol and an aliphatic isocyanate, and a fiberglass mat on a side of the decorative layer averted from the core.

16. The method of claim 9, further comprising the step of supplying heat at least one of during and after step c') to the polyurethane layer for forming the core.

17. The method of claim 9, wherein the fiber mat sheet is one of:
   a nonwoven mat, and
   a fabric sheet.

18. The method of claim 9, wherein the barrier layer is formed from a material selected from the group consisting of polyolefin, polyethylene terephthalate (PET), polyamides (PA) and thermoplastic polyurethane (TPU).

19. The method of claim 9, wherein the core in step b') is formed from a polyurethane, which is obtained from a polyester polyol of renewable raw materials and an aromatic isocyanate.

20. The method of claim 9, wherein the sheet-shaped layered compound structure is one of deposited and applied in step a') in a prefabricated state and comprises at least one decorative layer, which includes a fiber paper, which is impregnated with polyurethane, a wear-resistant use surface, which lies on a side of the decorative layer averted from the core and includes a polyurethane, which is obtained from a polyol and an aliphatic isocyanate, and a fiberglass mat on a side of the decorative layer averted from the core.

\* \* \* \* \*